United States Patent [19]
Ang et al.

[11] Patent Number: 6,144,788
[45] Date of Patent: Nov. 7, 2000

[54] HIGH STABILITY FIBER LIGHT SOURCE

[75] Inventors: Dick Ang, Glendale; Timothy L. Spicer, Phoenix, both of Ariz.

[73] Assignee: Honeywell, Inc., Morristown, N.J.

[21] Appl. No.: 09/107,677

[22] Filed: Jun. 30, 1998

[51] Int. Cl.[7] .............................. G02B 6/26; H01S 3/30; H04J 14/00; G01B 9/02

[52] U.S. Cl. .............................. 385/31; 385/38; 385/39; 385/24; 385/37; 385/12; 372/6; 359/115; 359/124; 359/134; 359/341; 356/345

[58] Field of Search ......................... 385/15, 12, 31–37, 385/38, 39, 24; 372/6; 359/115, 124, 134, 333, 341, 345; 356/345

[56] References Cited

U.S. PATENT DOCUMENTS

| | | | |
|---|---|---|---|
| 5,108,183 | 4/1992 | Fling et al. | 356/350 |
| 5,177,562 | 1/1993 | Wysocki et al. | 356/350 |
| 5,448,579 | 9/1995 | Chang et al. | 372/6 |
| 5,485,481 | 1/1996 | Ventrudo et al. | 372/6 |
| 5,689,595 | 11/1997 | Pan | 385/27 |
| 5,691,999 | 11/1997 | Ball et al. | 372/20 |
| 5,701,319 | 12/1997 | Fermann | 372/18 |
| 5,828,682 | 10/1998 | Moores | 372/26 |

FOREIGN PATENT DOCUMENTS

| | | | |
|---|---|---|---|
| WO 97 24786A | 7/1997 | WIPO | 372/6 X |

OTHER PUBLICATIONS

Authors: H. J. Patrick, A. D. Kersey, W. K. Burns and R. P. Moeller, "Erbium–Doped Superfluorescent Fibre Source With Long Period Fibre Grating Wavelength Stabilisation" Electronics Letters, GB, IEE Stevenage, vol. 33, No. 24, pp. 2061–2063 EP–000734308 ISSN: 0013–5194 (The Whole Document).

Authors: Douglas C. Hall, William K. Burns and Robert P. Moeller, "High–Stability ER3+–Doped SuperfluorescentFiber Sources", Journal of Lightwave Technology, US, IEEE, New York, vol. 13, No. 7, pp. 1452–1460 XP–000597669 ISSN: 0733–8724, p. 1453; figure 1.

Authors: L. Goldberg, R. P. Moeller and W. K. Burns "High–Power 1.5–MUM Superfluorescent Source For Fiber–Optic Gyroscopes" Conference on Optical Fiber Communications, US, New York, IEEE, pp. 28–29, XP–000776390 ISBN: 0–7803–3860–X (The whole document).

Authors: C. R. Giles, T. Erdogan and V. Mizrahi "Reflection–Induced Changes In The Optical Spectra of 980–nm QW Lasers" IEEE Photonics Technology Letters, US, IEEE Inc. New York, vol.6, No. 8, pp. 903–906 XP–000465478 ISSN: 1041–1135, pp. 903; Figure 1.

*Primary Examiner*—Brian Healy
*Attorney, Agent, or Firm*—Kris T. Fredrick

[57] ABSTRACT

A fiber light source having, for instance, a 980 nm pump laser for pumping an erbium-doped optical fiber via a 980/1550 nm WDM coupler. The pumped fiber emits 1550 nm light. A portion of the 1550 nm light goes to a filter via the WDM coupler. The filter shapes the spectrum of the 1550 nm light. The filter is a passive device that may be made from erbium-doped fiber. From the filter the 1550 nm light goes through an isolator or a circulator on to an optical device for which the light is specially made. Such device may be an fiber optic gyroscope. By adding a narrowband optical fiber grating at the output of the pump laser to tune its output, the fiber light source is further improved in stability under variations of ambient temperature and light source drive current.

31 Claims, 10 Drawing Sheets

| Ttec \ I Laser | 144.6 mA | 164.6 mA | 184.6 mA | Wavelength Change vs. I Laser |
|---|---|---|---|---|
| 15 Deg C | 1551.87 nm | 1551.41 nm | 1551.22 nm | (-)10.5 PPM per mA |
| 25 Deg C | 1551.26 nm | 1551.31 nm | 1551.35 nm | (+)1.45 PPM per mA |
| 35 Deg C | 1551.25 nm | 1551.81 nm | 1551.86 nm | (+)9.8 PPM per mA |
| Wavelength Change vs. Ttec | (-)20 PPM per C | (+)12.9 PPM per C | (+)20.6 PPM per C | |

Fig. 13

| Ttec \ I Laser | 135.3 mA | 155.3 mA | 175.3 mA | Wavelength Change vs. I Laser |
|---|---|---|---|---|
| 15 Deg C | 1552.89 nm | 1552.84 nm | 1552.80 nm | (-)1.45 PPM per mA |
| 25 Deg C | 1552.82 nm | 1552.81 nm | 1552.78 nm | (-)0.6 PPM per mA |
| 35 Deg C | 1552.82 nm | 1552.81 nm | 1552.79 nm | (-)0.5 PPM per mA |
| Wavelength Change vs. Ttec | (-)2.2 PPM per C | (+)1.0 PPM per C | (+)0.3 PPM per C | |

Fig. 14

HIGH STABILITY FIBER LIGHT SOURCE

BACKGROUND

The invention pertains to light sources and particularly to light sources used in interferometric fiber optic gyroscopes (IFOG's). More particularly, the invention pertains to fiber light sources (FLS).

The conventional architecture of a backward-pumped FLS includes a 1480 nanometer (nm) pump. The 1480 nm pump laser is used to optically pump the doped (e.g., Erbium) fiber. The output spectrum of the FLS with a 1480 nm pump has a significant 1560 nm emission band. The 1480 nm pump may be replaced by a more inexpensive 980 nm pump. However, the resulting FLS does not produce light with an acceptable output spectrum and thus a coherence function to permit an IFOG with the latter FLS to perform as well as an IFOG with a 1480 nm pump. The output spectrum of the FLS with a 980 nm pump has a very prominent 1530 nm emission band that can be strong compared to longer emission wavelengths including the 1556 nm band. The 1532 nm emission is much more sensitive to pump power and pump perturbations than the longer wavelength constituents of the spectrum. The resulting degradation in the coherence of the FLS adversely affects the spectral stability of the FLS and the bias stability of the IFOG. Spectral instabilities of the light adversely affect the scale factor stability in the IFOG, which is unacceptable in a navigation grade IFOG.

The 980 nm pump laser of the FLS needs to be specified to a very tight tolerance to provide satisfactory wavelength stability and wavelength repeatability at the FLS output. The wavelength stability and repeatability have a direct impact on the scale factor of the IFOG. Considering all of the related FLS dependencies of the parameters on the environmental temperature, the pump laser wavelength needs to be specified (at 975–985 nm to within plus and minus 0.5 nm) to match the EDF such that the output wavelength perturbation is minimal relative to pump wavelength perturbation (or change or deviation). This wavelength tolerance is ten times more narrow than for telecommunication applications. Although, in principle, one can set the pump operating wavelength by finding the correct temperature of the thermo electric cooler (TEC) which contains the pump, and operating the pump laser at this temperature. A related requirement for wide temperature operation on the total power dissipation of the pump, limits the TEC operating temperature between 30 and 35 degrees Centigrade (C.). The wavelength tolerance and power dissipation of the pump are two constraints that increase process and assembly complexity and decreases yield in pump manufacturing. The result is a high cost pump.

SUMMARY OF THE INVENTION

A spectral shaping fiber filter has been developed to tailor the spectrum of the FLS output so that the FLS is suitable for IFOG's. In order to improve the wavelength stability with respect to temperature environment, one incorporates a fiber Bragg grating that is matched to the absorption band of the doped fiber. The grating may be other than a Bragg grating. The doped fiber generates the broadband amplified spontaneous emission (ASE) spectrum. The fiber Bragg grating "locks" the pump optical wavelength to an optimum operating point for the doped fiber. In addition to this benefit, the Bragg grating permits the pump wavelength specification for manufacturing to be wider, which results in higher manufacturing yield and lower product cost. The Bragg grating also decreases FLS wavelength perturbation due to pump current perturbations and TEC temperature perturbations. This results in lower cost electronic circuitry that controls the pump.

The grating can be incorporated as part of the pump pigtail fiber to stabilize the pump wavelength. A narrowband grating of moderate reflectivity (i.e., about 2 to 10 percent) will dominate the laser gain curve and "lock" the laser output to the grating wavelength. Since gratings can be fabricated to narrow bandwidths and wavelength tolerances, the burden of precision manufacturing of the pump laser is alleviated. The strict requirements of the pump are shifted to the grating. Gratings are relatively easy to manufacture. They are available also from several manufacturers.

In addition to stabilizing the pump output wavelength, the inclusion of the grating decreases wavelength deviations due to laser drive current and TEC temperature perturbations. This means that the laser drive current affects the FLS output wavelength weakly, which is a desirable property of the light source.

The TEC temperature or setting affects the output wavelength to a lesser degree in an FLS equipped with a pump-wavelength stabilization grating. One can select the TEC operating temperature based entirely on the power dissipation requirements, independent of the FLS doped fiber requirements.

When the output of the FLS, which has a complex wide band spectrum having both a 1532 nm band and a 1556 nm band, is propagated through a non-optically pumped length of Erbium doped fiber (EDF), the 1532 nm band is preferentially absorbed and down-converted to a 1556 nm emission. A length of EDF is used as a spectrum curve-shaping filter to provide a desirable emission from the FLS. Alternatively, a fiber Bragg grating may be used as the filter. The filter may affect the spectrum by making certain parts of the spectrum of the light to be filtered, lossy.

BRIEF DESCRIPTION OF THE DRAWING

FIG. 13 is a table showing wavelength variation of the output of the fiber light source of FIG. 5, for various settings of TEC temperature and pump current.

FIG. 14 is a table showing wavelength variation of the output of the fiber light source of FIG. 8, for various settings of TEC temperature and pump current.

DESCRIPTION OF THE EMBODIMENTS

Figure 1:
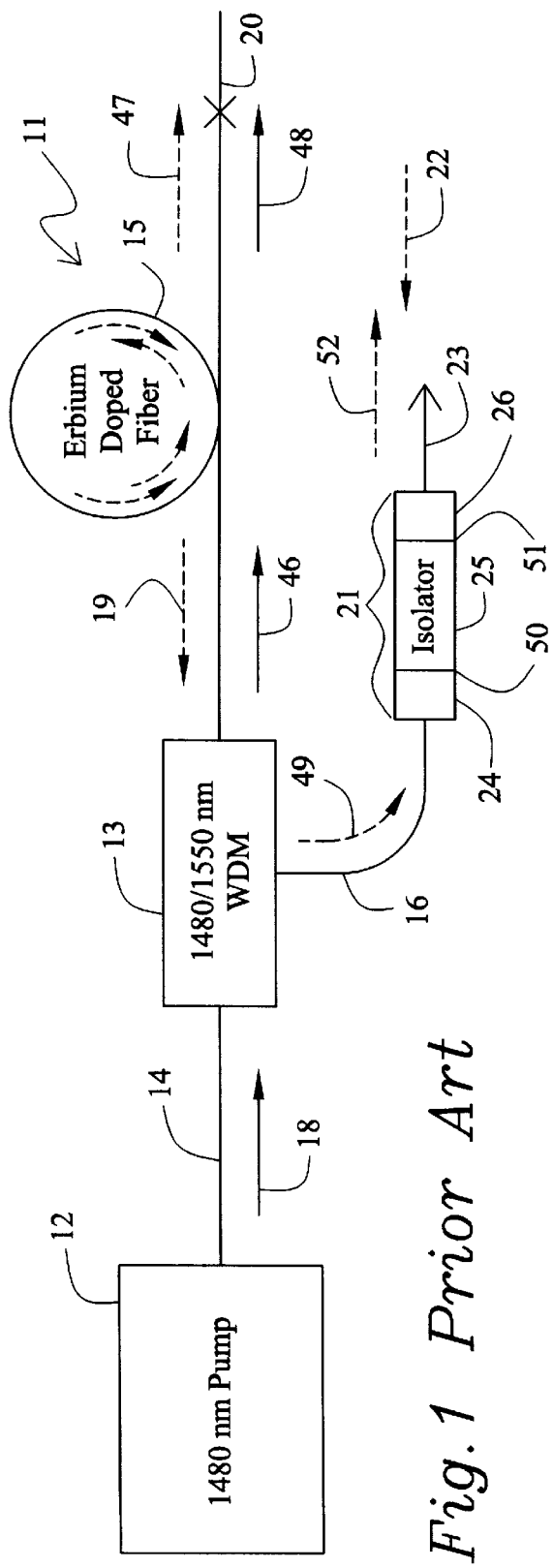
FIG. 1 shows a related art fiber light source having a backward pumped configuration, with a 1480 nm pump.

FIG. 1 reveals a conventional fiber light source (FLS) having a backward pumped configuration 11 utilizing a 1480 nanometer (nm) laser pump 12. Pump 12 outputs a 1480 nm wavelength light signal 18 that goes to wavelength-division multiplexing (WDM) coupler 13 via fiber 14. There are at least two versions of a WDM coupler. One is all fiber coupler made by fusing two fibers, like that of a 50/50 coupler; however, the coupling region is optimized such that one band of the wavelength (e.g., 980 nm) is coupled to the "cross" port, while the other band of wavelength (1550 nm) is not coupled, i.e., it goes straight through. The second version involves a micro-optic device, which may use a grating.

Figure 2:
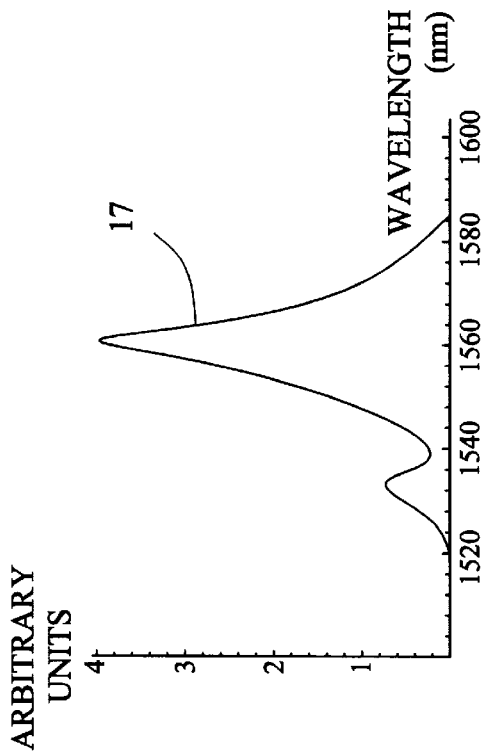
FIG. 2 is a graph of the spectrum of the output of the fiber light source in FIG. 1.

The 1480 nm light 46 is directed into an erbium-doped fiber 15 by WDM coupler 13. WDM coupler 13 prevents the 1480 nm light from propagating into fiber 16. Erbium-doped fiber 15 is pumped by 1480 nm light 46 in that the erbium ions absorb this light. Erbium has an absorption range from 500 nm to 1500 nm. The erbium of fiber 15 has an emission range from about 1520 nm to about 1580 nm, depending on the pump light wavelength and intensity. For a pump light wavelength of 1480 nm, the spectrum of light 19 and 47 from erbium emission is shown by curve 17 in FIG. 2. There is a large intensity peak at 1550 nm and a smaller peak at around 1530 nm. Fiber 15 can absorb light at a multiplicity of wavelengths. The absorption peaks of erbium are near 528 nm, 650 nm, 800 nm, 980 nm and 1490 nm.

Fiber 15 is formed from a silica glass that is doped with erbium at a concentration between 50 and 2000 parts per million (ppm). Although erbium-doped optical fiber is preferable, optical fiber 15 can be doped with another suitable lasing material such as neodymium or one of the other elements in the lanthanide series.

Light 19 and 47 emitted from doped fiber 15 goes both ways in the fiber. Fiber 15 has a light terminator 20 at the end of it. Terminator 20 absorbs and dumps excess light 48 and 47 in fiber 15 from the erbium-doped fiber and the pump. This absorption and dumping is for preventing any pump light being reflected back to the pump via WDM coupler 13 and fiber 14 which would adversely affect the output of pump 12 and result in an undesired light signal ultimately emitted by the erbium in fiber 15.

Light emitted from the erbium fiber 15 that goes to WDM coupler 13 is blocked from pump 12 and channeled to fiber 16. Light 49 goes through isolator 21 to become an output of fiber light source 11. Since output 22 of light source 11 may be connected to a fiber optic gyroscope or other optical device (such as a current sensor or an optical test instrument), via a fiber 23, there often is light reflected back to FLS 11. Such reflected light could adversely affect the output of source 11. Isolator 21 prevents such light being reflected into fiber 16 of the source.

Isolator 21 may have various structures. The present isolator 21 has a linear polarizer 24 at the end of isolator 21 connected to fiber 16. A Faraday rotator 25 is adjacent to polarizer 24. A second polarizer 26 is adjacent to Faraday rotator 25 and connected to fiber 23. Polarizer 26 has a polarization direction that is 45 degrees relative to polarizer 24. Light 49 from fiber 16 passes through polarizer 24 and is linearly polarized in a particular direction. The direction of linearly polarized light 50 is rotated 45 degrees by Faraday rotator 25. The rotator may be a permanent magnet applying a magnetic field to an optically active element conveying light 50, thereby shifting the polarization direction by 45 degrees. Light 51, which now has a polarization direction the same as that of the second polarizer, goes through polarizer 26 and enters fiber 23 as light 52 to be conveyed to a gyroscope or another optical device. Typically, light 22 that is reflected from the gyroscope or other optical device is linearly polarized light having a polarization direction which is the same as that of polarized light 52. So reflected light 22 passes through polarizer 26 and Faraday rotator 25. The polarization direction of light 22 is rotated another 45 degrees so that light 22 has a polarization direction of 90 degrees relative to the direction of linear polarizer 24. Thus, reflected light 22 is blocked by polarizer 24. If light is reflected from the gyroscope in cross polarization for some reason, i.e. at 135 degrees, it won't get through polarizer 26. So both polarizations of returning light are blocked. This is a single polarization isolator, but a polarization independent isolator known in the art may be used in lieu of the described isolator.

Figures 3, 4:
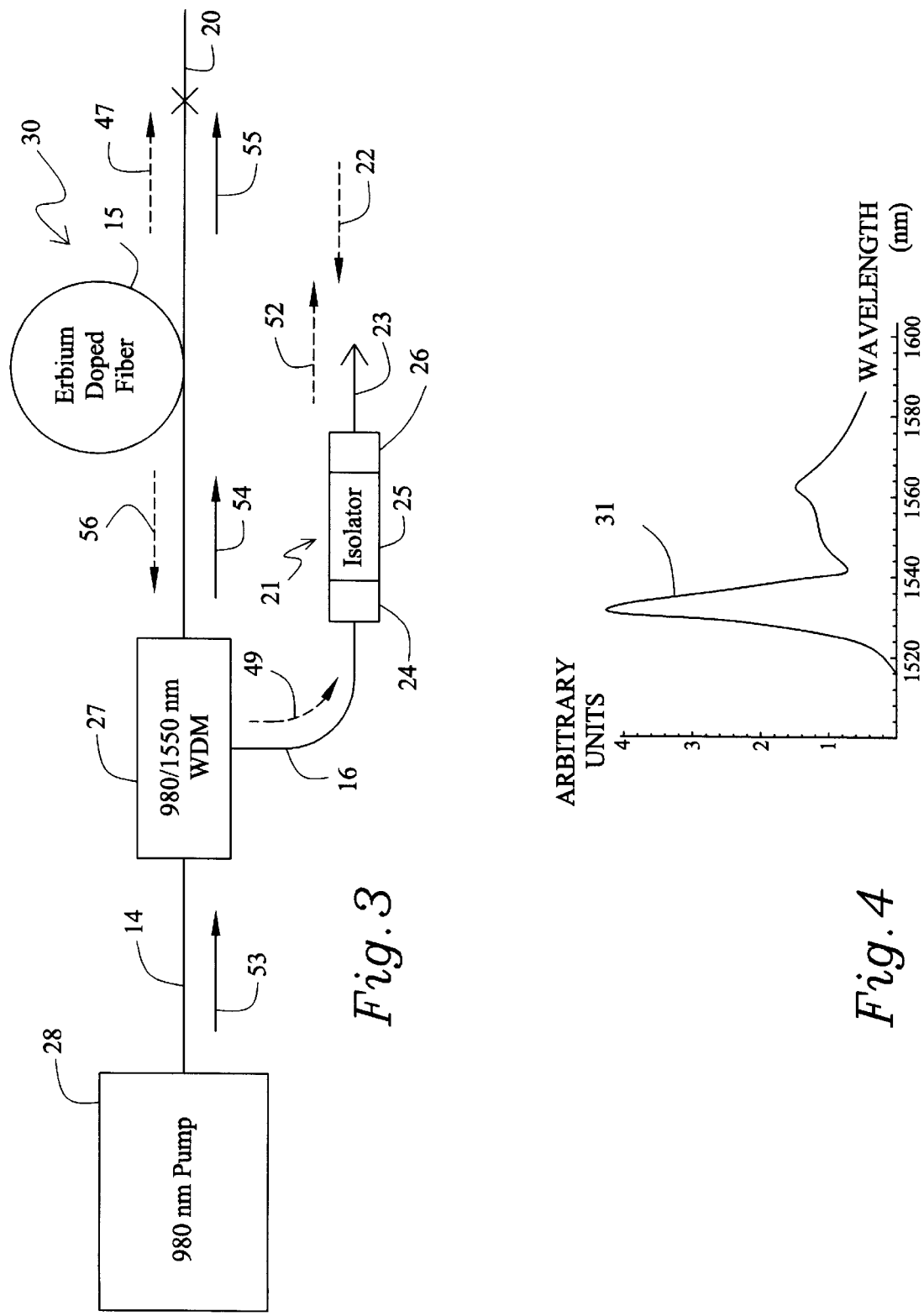
FIG. 3 shows a fiber light source having a 980 nm pump in lieu of the 1480 nm pump shown in FIG. 1.
FIG. 4 is a graph of the spectrum of the output of the fiber light source in FIG. 3.

FIG. 3 shows a fiber light source 30 like that of FIG. 1 except source 30 has a 980 nm pump 28 instead of the 1480 nm pump 12. Light 53 from pump 28 goes down fiber 14 and through a 980/1550 nm WDM coupler 27 to erbium-doped fiber 15. Light 54 pumps the erbium ions in fiber 15 by absorption. Remaining and excess light 55 is absorbed and dumped by termination 20. The pumped erbium ions emit light 56 having a spectrum 31 shown in FIG. 4. Cost is a significant reason for replacing 1480 nm pump laser 12 with 980 nm pump laser 28. Output spectrum 31 of source 30 is not as favorable as output spectrum 17 of source 11.

Output spectrum 31 of fiber light source 30 has a strong emission band at around 1530 nm. That is significant compared to the 1556 nm band. The 1530 nm emission is much more sensitive to pump power and wavelength perturbations than the 1556 nm emission.

Figure 5:
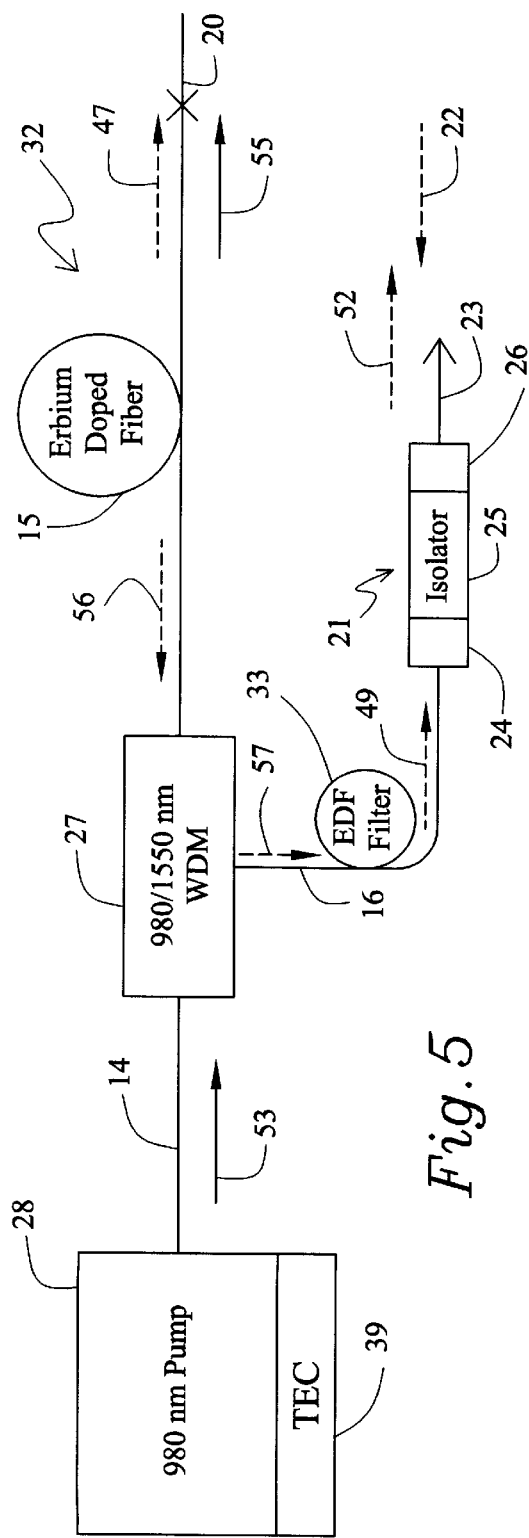
FIG. 5 shows a fiber light source of FIG. 3, which is modified to incorporate an Erbium doped fiber filter.
Figure 6:
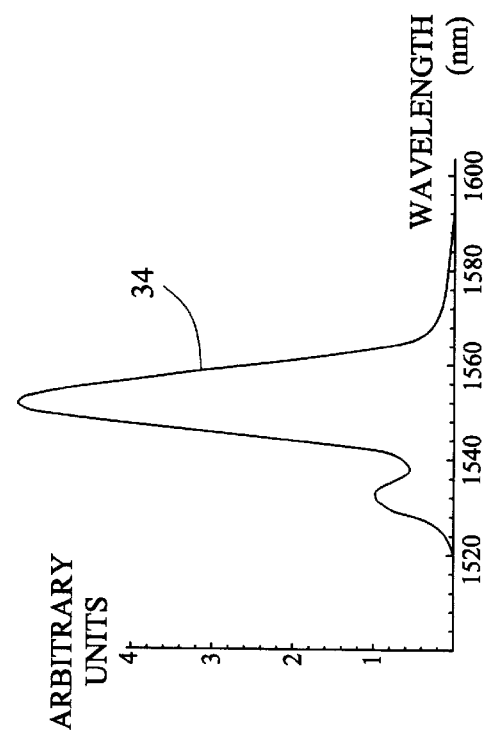
FIG. 6 is a graph of the spectrum of the output of the fiber light source in FIG. 5.

FIG. 5 shows a fiber light source 32 like that of FIG. 3 except source 32 has a filter 33 between WDM coupler 27 and isolator 21. Signal 57 from WDM coupler 27 is propagated through a non-optically pumped length of erbium-doped fiber (EDF) which is filter 33. The 1530 nm band is preferentially absorbed and down-converted to 1556 nm emission as shown by spectrum curve 34 of FIG. 6. Filter 33 is a passive spectrum or waveshaping filter. Other kinds of passive or active filters may be used in place of filter 33.

Figure 7:
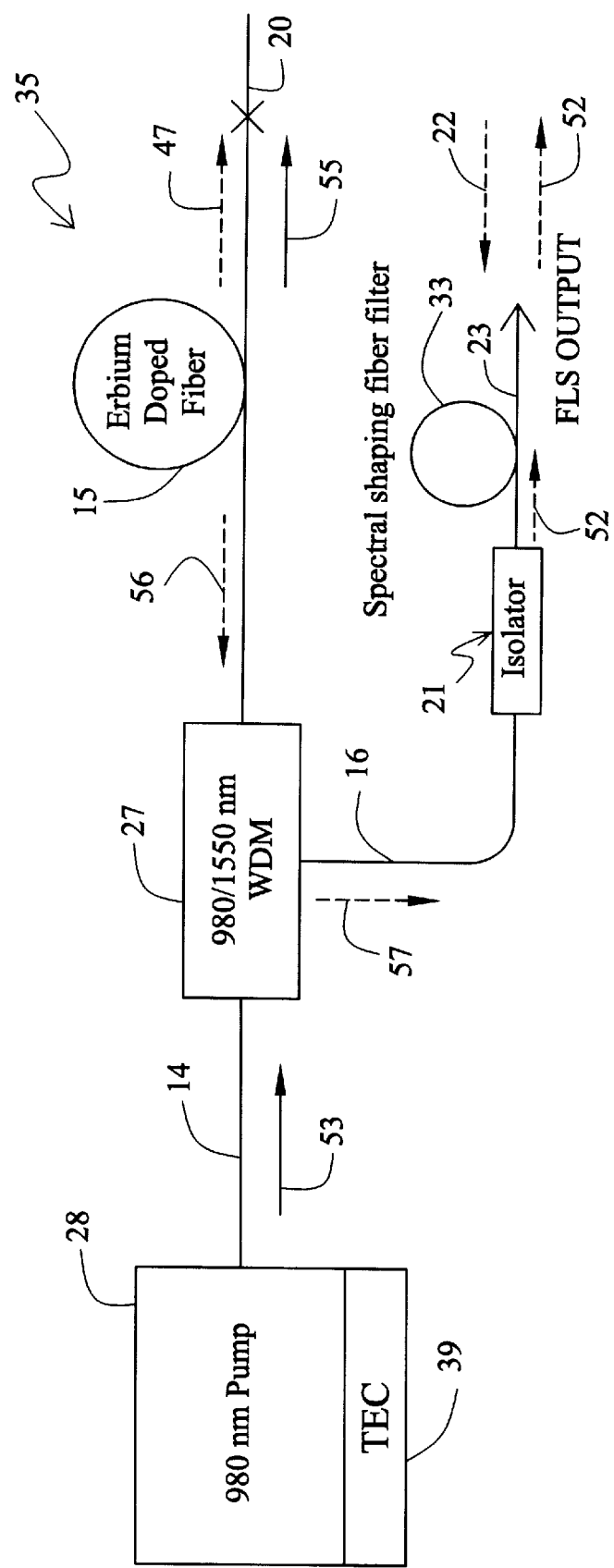
FIG. 7 shows a fiber light source like that of FIG. 5 but with a different filter placement.

An alternate configuration 35 of fiber light source 32, having another location for spectrum-shaping filter 33, is shown in FIG. 7. Instead of between WDM coupler 27 and isolator 21, filter 33 is placed at the output of isolator 21 and filter 33 provides the output of light source 35. The spectrum of the output of source 35 is similar to spectrum 34 of source 32.

Figure 8:
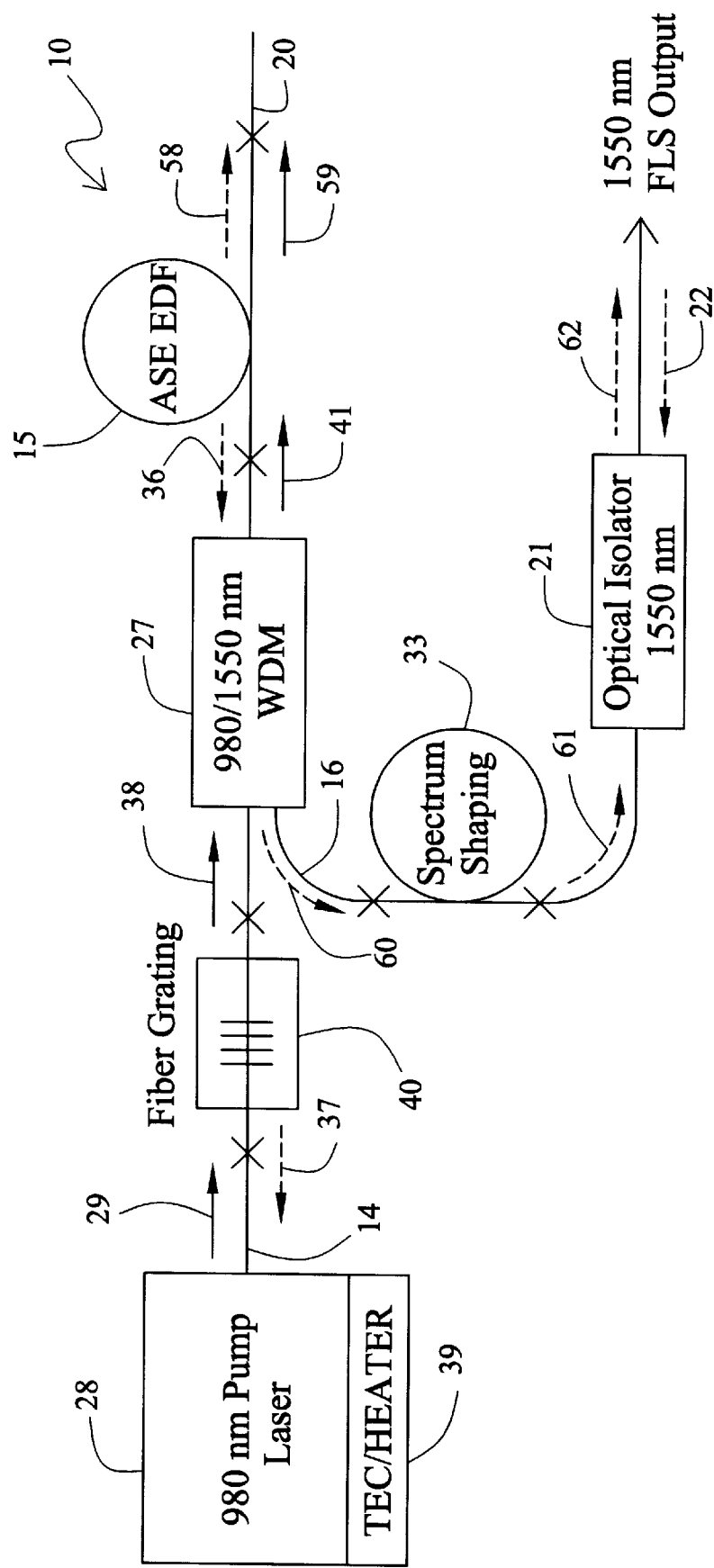
FIG. 8 shows a fiber light source like that of FIG. 5 but with a fiber grating at the output of the pump.

FIG. 8 reveals a fiber light source 10 having a 980 nm pump laser which is stabilized by using a fiber grating 40. The grating may be tuned at a wavelength between 975 and 985 nm to match doped fiber 15 within plus and minus 0.5 nm. The wavelength of the doped fiber will vary from fiber to fiber depending on the composition and other physical characteristics of the fiber. For instance, co-doping the erbium fiber with aluminum permits an increase of the erbium without a clustering of the erbium in the fiber, and results in a shift of the erbium-doped fiber absorption band.

Actually, grating 40 and laser 28 function at the optimum line of absorption of the erbium. The "980 nm" label is a nominal term for pump 28.

Grating 40 reflects some light 37 back to pump laser 28. Reflected light 37 results in a wavelength-tuned reflection that causes laser 28 to preferably lase at the grating wavelength. Grating 40 can be incorporated as part of the pump 28 pigtail to stabilize the pump 28 wavelength.

Grating 40 is a narrowband grating of moderate reflectivity (i.e., about 2 to 10 percent) which dominates the laser 28 gain and "locks" laser 28 output to the grating 40 wavelength. Since gratings can be fabricated to narrow bandwidths and wavelength tolerances, the burden and expense of manufacturing a laser pump having very tight wavelength tolerances in the output are reduced because the wavelength requirements are shifted to the grating. Gratings having tight specifications are considerably less expensive and easier to manufacture than a pump made to provide comparable performance to that of a pump with relatively loose specifications and functioning in tandem with a grating. In addition to stabilizing the pump 28 wavelength, the inclusion of grating 40 decreases wavelength deviations due to laser drive current and thermoelectric cooler (TEC) 39 temperature perturbation. TEC 39 provides a pre-set temperature environment for laser pump 28. Thus, one can select the TEC 39 operating temperature based on power dissipation requirements rather than a pumped wavelength requirement based on a specific doped fiber absorption.

With grating 40, pump 28 wavelength variation tolerance increases from plus and minus 0.5 nm to plus and minus 5.0 nm. Laser pump 28 drive current variation tolerance increases from plus and minus 0.1 milliampere (mA) to plus and minus 1.0 mA. TEC 39 temperature setting can be fixed from about 30 to 35 degrees centigrade (C.), and therefore the TEC driver can be designed as a generic circuit card. These loosened requirements result in cost reduction in manufacturing fiber light source 10 and its associated electronics. Improved performance of source 10 implies improved performance of the fiber optic gyroscope or other optical device that utilizes source 10.

Back to FIG. 8, light 38 having a stable wavelength selected or determined by grating 40, goes from grating 40 through 980/1550 nm WDM coupler 27 and as light 41 to an erbium-doped fiber 15, having a length between 10 and 100 meters, wherein the erbium is pumped and then decays with an emission of 1550 nm light 36. Excess light 58 and 59 going towards absorber 20 is dumped by the absorber. Light 36 going towards WDM coupler 27 goes through the WDM coupler into fiber 16. Light 60 goes through spectrum shaping erbium-doped fiber 33 and as light 61 on through 1550 nm optical isolator 21 to become output light 62 from fiber light source 10. As shown above, reflected light 22 is blocked by isolator 21.

Figure 9:
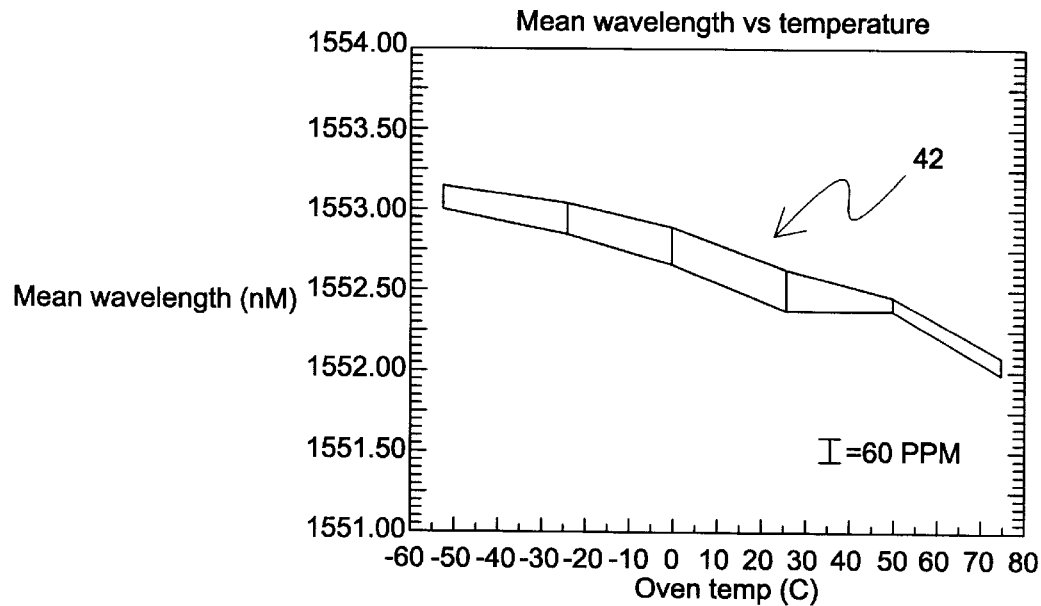
FIG. 9 is a graph of the output of the fiber light source in FIG. 5, for mean wavelength versus temperature.

FIG. 9 is a graph having a curve 42 that shows mean wavelength versus temperature for fiber light source 32 of FIG. 5, not having a grating 40 at the output of pump 28. Fiber light source 32 is situated in an oven that is varied from −55 to 80 degrees C. The TEC 39 temperature is set at a certain level, and the pump 28 current is at a particular value. The wavelength repeatability for source 32 shown by this graph is about 100 ppm.

Figure 10:
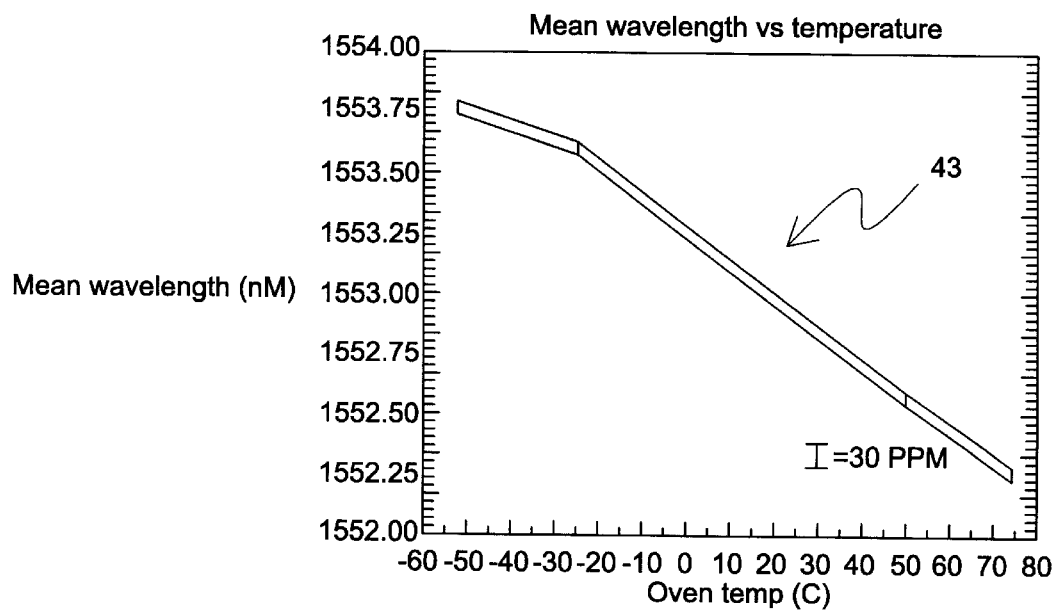
FIG. 10 is a graph of the output of the fiber light source in FIG. 8, for mean wavelength versus temperature.

FIG. 10 is a graph having a curve 43 that shows mean wavelength versus temperature for fiber light source 10 of FIG. 8, having a grating 40 at the output of pump 28. Fiber light source 10 is situated in an oven that is varied from −55 to 80 degrees C. The TEC 39 temperature is fixed, and the pump 28 current is fixed. The wavelength repeatability shown by this graph is about 30 ppm. Grating 40 at the output of pump 28 improves wavelength stability over temperature deviation by three times.

Figure 11:
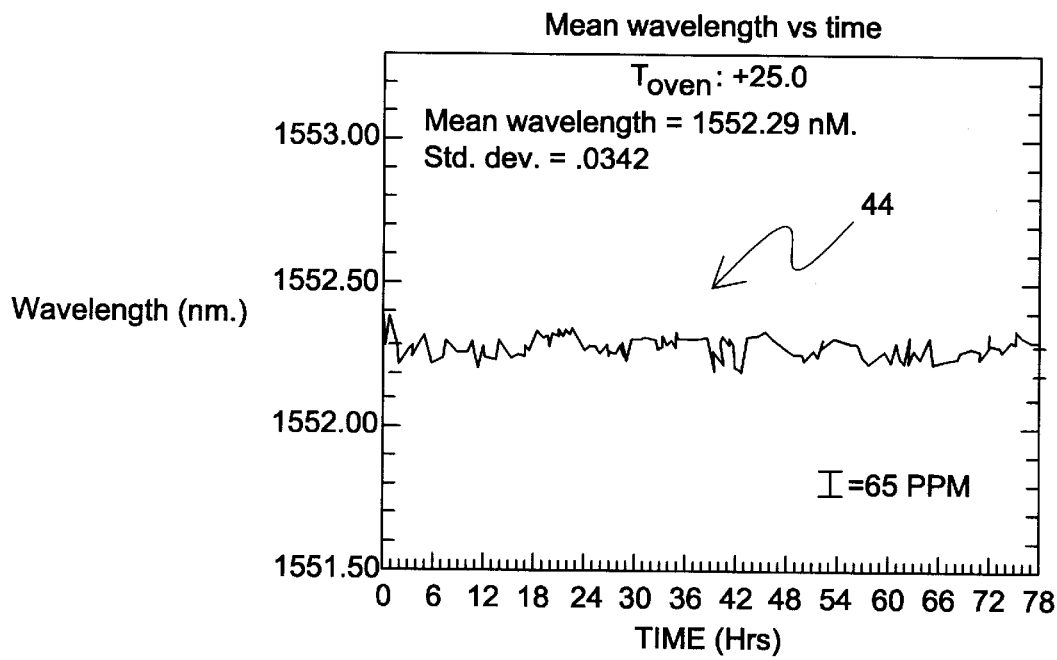
FIG. 11 is a graph of the output of the fiber light source of FIG. 5, for mean wavelength versus time.

FIG. 11 is a graph having a curve 44 that shows mean wavelength versus time for fiber light source 32 of FIG. 5, not having a grating 40 at the output of pump 28. Fiber light source 32 is operated over a period of 78 hours. TEC 39 temperature is fixed, and the pump 28 current is fixed at a particular value. Source 32 is in an oven set at 25 degrees C. The mean wavelength in this graph is 1552.29 nm with a standard deviation of 0.0342. The wavelength stability is 22 ppm over 72 hours.

Figure 12:
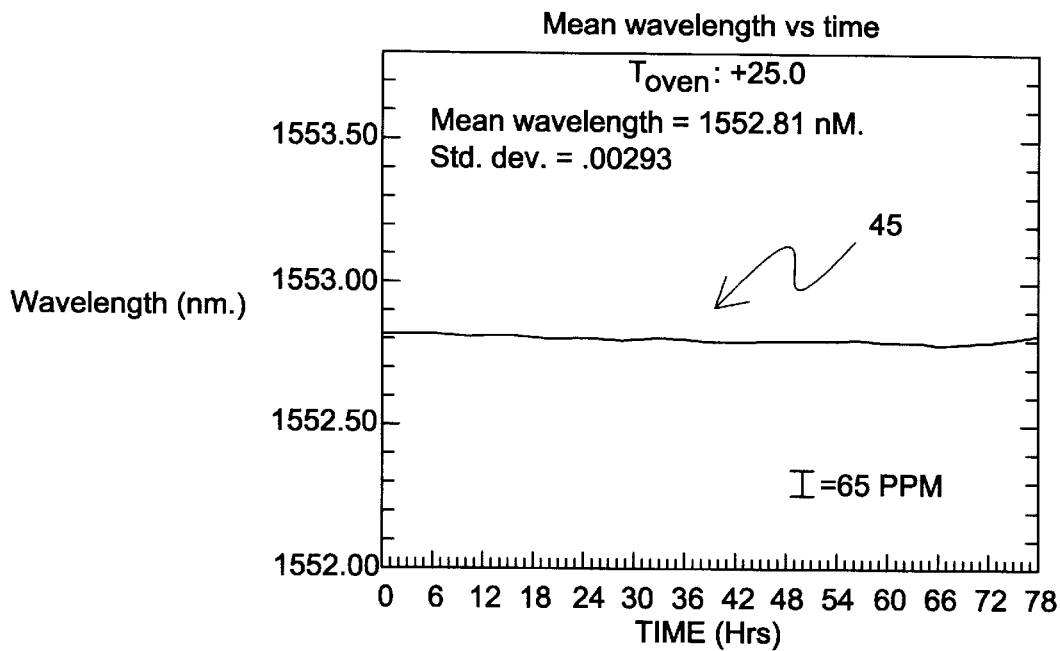
FIG. 12 is a graph of the output of the fiber light source of FIG. 8, for mean wavelength versus time.

FIG. 12 is a graph having a curve 45 that shows mean wavelength versus time for fiber light source 10 of FIG. 8, having a grating 40 at the output of pump 28. Fiber light source 10 is situated in an oven set at 25 degrees C. The TEC 39 temperature is fixed, and the current is also fixed. Source 32 is operated over a period of 72 hours. The mean wavelength is 1552.81 nm with a standard deviation of 0.00293. The wavelength stability is 2 ppm. Grating 40 at the output of pump 28 improves wavelength stability over time by ten times.

FIG. 13 is a table showing the wavelength variation in view of various settings of the TEC 39 temperature (Ttec) and pump 28 current (I Laser) for fiber light source 32 of FIG. 5, not having a grating 40 at the output of pump 28. FIG. 14 is another table showing the wavelength variation in view of various settings of the TEC 39 temperature (Ttec) and pump 28 current (I Laser) for fiber light source 10 of FIG. 8, having a grating 40 at the output of pump 28. It is easy to recognize from the above-noted figures that a fiber light source having a grating at the output of its laser pump is much less sensitive to changes or perturbations of temperature and pump current, than a pump without a grating.

Figure 15:
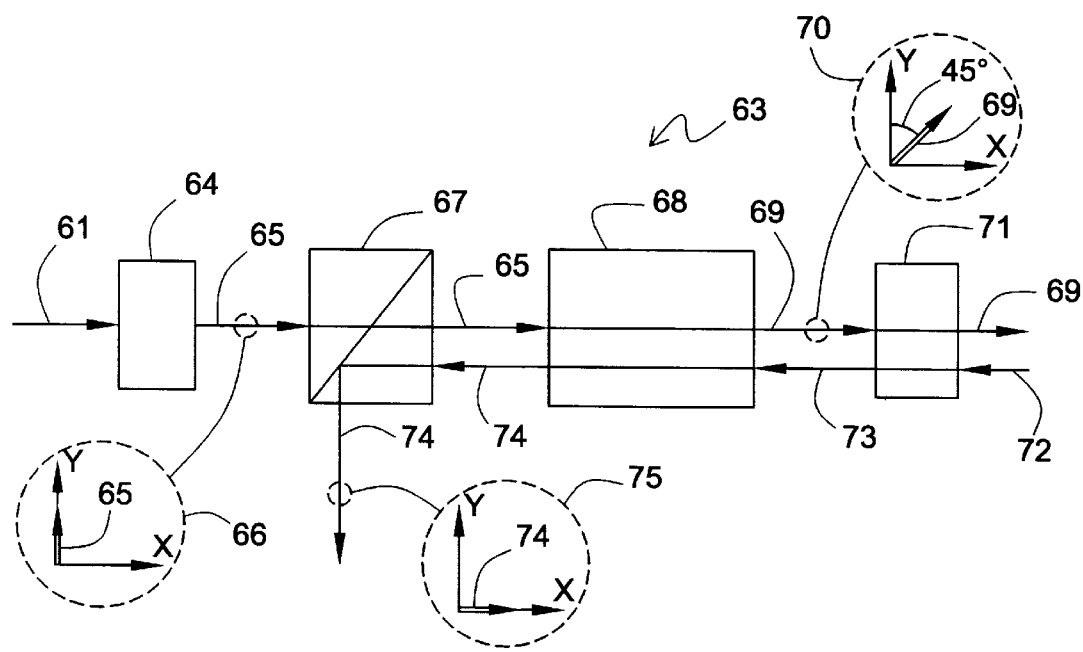
FIG. 15 reveals a layout of an optical circulator.

An optical circulator 63 of FIG. 15 may be used in lieu of optical isolator 21. Light 61 enters a first port of circulator 63 and goes into polarizer 64. Polarizer 64 polarizes light 61 into light 65 in the Y direction as shown by insert 66. Light 65 goes through beam splitter 67 into Faraday rotator 68. The polarization of light 65 is rotated 45 degrees resulting in light 69 as shown by insert 70. Light 69 goes to polarizer 71 that is positioned so that light passes through polarizer 71 and out of a second port of circulator 63. Returned or reflected light 72 is polarized by polarizer 71 into light 73. Light 73 goes through Faraday rotator 68 to have its polarization rotated 45 degrees into light 74 which has a polarization with a 90-degree difference from the polarization of light 65. Thus, the polarization of light 74 is in the X direction. Light 74 is reflected by polarization-sensitive beam splitter 67 out of the third port of circulator 63 as light 74 shown by insert 75. Beam splitter 67 passes Y-polarized light and reflects X-polarized light.

Figure 16:
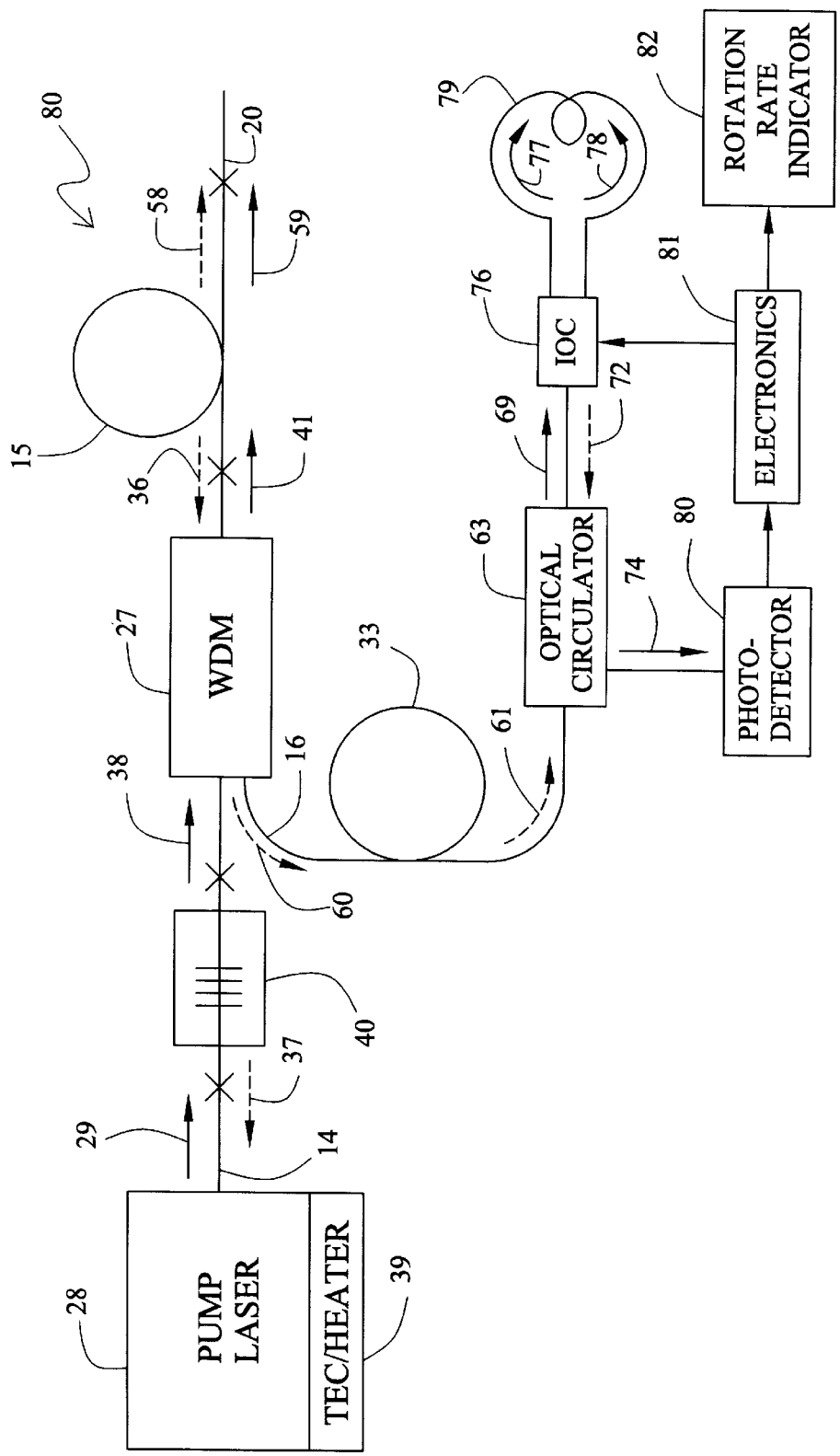
FIG. 16 shows a fiber light source having an optical circulator.

FIG. 16 shows a configuration 80 of a fiber light source, similar to configuration 10 of FIG. 8, except without isolator 21. Fiber light source 80 has an optical circulator 63. Optical circulator 63 may be connected between WDM coupler 27 and filter 33 or at the output of filter 33. This light source 80 is shown connected to a fiber optical gyroscope, although it may be connected to another optical device. In the gyroscope, circulator 63 is in place of a source coupler. The circulator can save up to 6 decibels (dB) of light. Light 69 leaves optical circulator 63 and goes to an integrated optical circuit 76 where the light is polarized and split into two beams 77 and 78 which may be modulated and then counter-propagated in sensing loop 79. Beams 77 and 78 then return from loop 79 and are combined into light 72 that returns to circulator 63. Light 72 is polarized, rotated in polarization direction and reflected out to photo-detector 80 as light 74. Photo-detector 80 converts light 74 to an electrical signal that is processed by electronics 81. Electronics 81 provides a bias modulation signal (and in the case of a closed-loop gyroscope a feedback signal) to at least one modulator in IOC 76. Sensing loop 79 may be made from polarization-maintaining (PM) optical fiber or single mode (non-PM) fiber with one or two depolarizers. Electronics 81 provides a rate signal to rotation rate indicator 82.

What is claimed is:

1. A high stability fiber light source comprising:
   a pump laser;
   a fiber grating coupled to said pump laser;
   a WDM coupler coupled to said fiber grating;
   a rare-earth-doped fiber coupled to said WDM coupler, wherein said rare-earth-doped fiber has an absorption band, and wherein said fiber grating is matched to said absorption band such that light from said fiber grating generates light;
   a filter coupled to said WDM coupler, said filter being configured to shape light generated by said rare-earth-doped fiber to a desired waveform; and
   an optical isolator coupled to said filter.

2. The fiber light source of claim 1, wherein an optical circulator is connected in lieu of said optical isolator.

3. The fiber light source of claim 1, wherein:
   said pump laser is configured to emit light having a first wavelength;
   said rare-earth-doped fiber is configured to emit light having a second wavelength; and
   said WDM coupler is configured to pass light from said pump laser to said rare-earth-doped fiber, to pass light from said rare-earth-doped fiber to said filter, and to block light having the second wavelength to said pump laser.

4. The fiber light source of claim 3, further comprising an optical absorber coupled to said rare-earth-doped fiber.

5. The fiber light source of claim 4, wherein said optical isolator is configured to pass light in a first direction and block light in a second direction.

6. The fiber light source of claim 5, wherein said filter is configured to shape a spectrum of light from said WDM coupler.

7. The fiber light source of claim 6, wherein said fiber grating is tuned to the first wavelength.

8. The fiber light source of claim 7, wherein said filter is a rare-earth-doped optical fiber.

9. The fiber light source of claim 7, wherein said filter is a second fiber grating.

10. The fiber light source of claim 7, wherein:
    the first wavelength is about 980 nm; and
    the second wavelength is about 1550 nm.

11. The fiber light source of claim 4, wherein said rare-earth-doped fiber is an erbium-doped fiber.

12. The fiber light source of claim 4, wherein the rare earth of said rare-earth-doped fiber, is an element of a lanthanide series.

13. The fiber light source of claim 8, wherein said filter is an erbium-doped optical fiber.

14. The fiber light source of claim 12, further comprising a thermoelectric cooler associated with said pump laser.

15. The fiber light source of claim 12, further comprising a heater associated with said pump laser.

16. A method for attaining high stability light output from a fiber light source, comprising:
    obtaining a first wavelength light from a pump laser;
    conveying the first wavelength light into a first wavelength grating that reflects a first portion of the first wavelength light back to the pump laser to stabilize the wavelength of the light from the pump laser;
    passing a second portion of the first wavelength light through the grating into a rare-earth-doped fiber to pump the rare earth in the doped fiber, which then emits light of a second wavelength light;
    conveying the second wavelength light through a filter to shape a spectrum of the second wavelength light; and
    conveying the second wavelength light from the filter as an output.

17. The method of claim 16 further comprising:
    absorbing first wavelength light in the rare-earth-doped fiber;
    preventing second wavelength light from going to the grating; and
    preventing second wavelength light from being reflected from the output to the filter.

18. The method of claim 17 wherein:
    the first wavelength is approximately 980 nm; and
    the second wavelength is approximately 1550 nm.

19. A high stability fiber light source comprising:
    means for generating light at a first wavelength;
    grating means for reflecting a first portion of said light at the first wavelength to said means for generating light, proximate to said means for generating light;
    coupling means, proximate to said grating means, having first, second and third ports, for passing a second portion of said light at the first wavelength from the first port to the second port, blocking light at a second wavelength from the second port to the first port, and passing light at the first wavelength from the second port to the third port;
    means, proximate to said coupling means, for absorbing light of the first wavelength and emitting light of the second wavelength; and
    means, proximate to said coupling means, for filtering light of the second wavelength from the third port of said coupling means.

20. The light source of claim 19 further comprising a means, proximate to said means for filtering light, for passing light of the second wavelength to an output and for blocking light of the second wavelength from the output.

21. The light source of claim 20, wherein said means for absorbing light of the first wavelength and emitting light of the second wavelength comprises a rare earth which absorbs light of the first wavelength and emits light of the second wavelength.

22. The light source of claim 21, wherein the output is connected to an optical device.

23. The light source of claim 22, wherein the optical device is a fiber optic rotation sensor.

24. The light source of claim 22, wherein the optical device is a current sensor.

25. The light source of claim 22, wherein the optical device is an optical testing instrument.

26. A light source comprising:
    a pump laser providing pump light to a doped fiber;
    a grating optically situated between said pump laser and said doped fiber, wherein said grating is matched to an absorption band of said doped fiber such that said pump light corresponds to said absorption band, and wherein said doped fiber generates light in response to said pump light; and an optical filter configured to shape the light generated by said doped fiber to produce a desired output waveform.

27. The light source of claim 26 wherein said grating, said filter and said doped fiber are coupled by a wavelength-division multiplexer.

28. The light source of claim 26 wherein said light source is coupled to said optical coil by an optical circulator.

29. A fiber optic gyroscope comprising a light source providing a light that forms counter-rotating light beams in an optical coil such that a phase difference between said counter-rotating light beams is indicative of a rotation rate, wherein said light source comprises:

a pump laser providing pump light to a doped fiber;

a grating optically situated between said pump laser and said doped fiber, wherein said grating is matched to an absorption band of said doped fiber such that said pump light corresponds to said absorption band, and wherein said doped fiber generates light in response to said pump light; and an optical filter configured to shape the light generated by said doped fiber to produce a desired output waveform.

30. The fiber optic gyroscope of claim 29 wherein said grating, said filter and said doped fiber are coupled by a wavelength-division multiplexer.

31. The light source of claim 29 wherein said light source is coupled to said optical coil by an optical circulator.

* * * * *